(12) United States Patent
Guo et al.

(10) Patent No.: US 8,241,746 B2
(45) Date of Patent: Aug. 14, 2012

(54) TISSUE CASSETTE LABEL

(75) Inventors: Liping Guo, Milwaukee, WI (US); Mary J. Janicek, Boscobel, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 641 days.

(21) Appl. No.: 12/360,951

(22) Filed: Jan. 28, 2009

(65) Prior Publication Data

US 2010/0190205 A1    Jul. 29, 2010

(51) Int. Cl.
*B32B 7/12* (2006.01)
(52) U.S. Cl. ............ 428/354; 428/355 AC; 428/32.6
(58) Field of Classification Search ........... 428/40.1, 428/354, 32.6, 355 AC
See application file for complete search history.

(56) References Cited

U.S. PATENT DOCUMENTS

| | | | |
|---|---|---|---|
| RE24,906 E | 12/1960 | Ulrich | |
| 2,973,286 A | 2/1961 | Ulrich | |
| 3,978,274 A * | 8/1976 | Blum | 428/476.3 |
| 5,288,548 A | 2/1994 | Weber | |
| 5,419,960 A * | 5/1995 | Touhsaent | 428/331 |
| 5,670,226 A * | 9/1997 | Yoshizawa et al. | 428/40.1 |
| 7,081,284 B2 | 7/2006 | Hiroishi | |
| 2003/0133004 A1* | 7/2003 | Miyajima et al. | 347/213 |
| 2004/0005428 A1* | 1/2004 | Katoh et al. | 428/42.3 |
| 2006/0100357 A1* | 5/2006 | Bunn et al. | 524/556 |
| 2007/0042142 A1* | 2/2007 | O'Brien et al. | 428/32.34 |
| 2008/0053605 A1* | 3/2008 | Seiders | 156/250 |
| 2008/0178988 A1* | 7/2008 | Ambartsoumian | 156/80 |
| 2009/0210254 A1 | 8/2009 | Gurney | |

FOREIGN PATENT DOCUMENTS

EP    1640426 A2    3/2006

* cited by examiner

*Primary Examiner* — Hai Vo
(74) *Attorney, Agent, or Firm* — Whyte Hirschboeck Dudek SC

(57) ABSTRACT

A multilayer label comprising a polymeric film or cloth, e.g., a polyester film or a polyester woven cloth, having opposing facial surfaces, one facial surface of which is in intimate contact with a xylene-resistant, water-based topcoat and the other facial surface of which is in intimate contact with a pressure sensitive adhesive (PSA) if the other facial surface is a cloth, or a water-based, melted wax-resistant PSA if the other facial surface is a film.

8 Claims, 4 Drawing Sheets

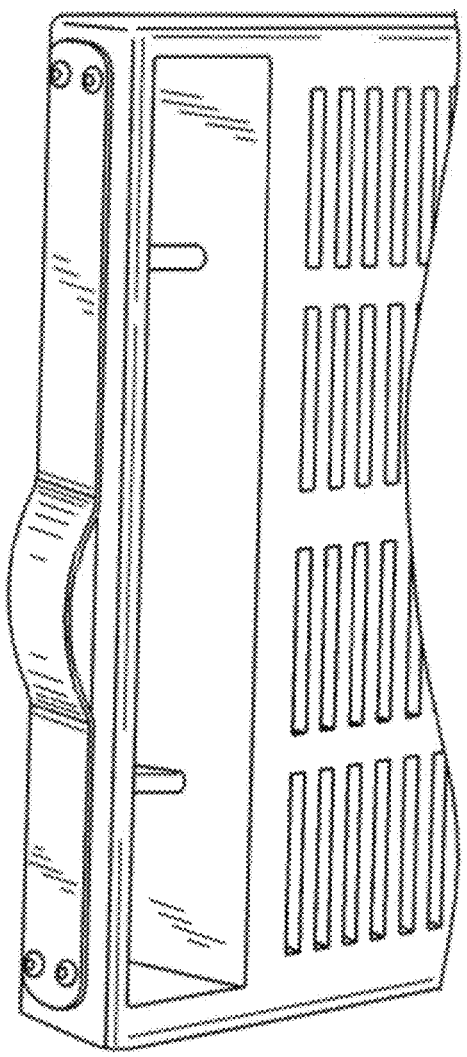

TISSUE CASSETTE LABEL

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention relates to a label. In one aspect the invention relates to a label adapted for use on a tissue cassette while in another aspect, the invention relates to a label adapted to attachment to a tissue cassette by heat staking. In yet another aspect, the invention relates to a multilayer label comprising a base layer and a topcoat layer while in still another aspect, the invention relates to a label adapted for thermal transfer printing.

BACKGROUND OF THE INVENTION

Tissue cassettes are commonly used in histology laboratories to carry tissue samples while they are bathed in a series of washes designed to remove the water in the tissue and replace it with wax. The wax stiffens the tissue sufficiently to allow it to be thinly sliced in a microtome. The thin slice or section is then placed on a slide, stained and evaluated by a pathologist to diagnose potential disease.

Tissue processing includes a multitude of steps. Typically, the tissue is first dehydrated by replacing fixative and water with a dehydrating liquid. The tissue is then flushed of the dehydrating fluid using a fluid that is totally miscible with both the dehydrating fluid and an embedding medium. Impregnation follows by replacing the flushing (i.e., clearing) fluid with the embedding medium.

Impregnation is typically conducted in an automated, closed-door processor in which the tissue is first exposed to various solvents, e.g., a mixture of an alcohol and xylene, and then impregnated with the embedding media, e.g., a paraffin wax. This process often includes agitation of the materials, a vacuum or partial vacuum atmosphere, and warm temperatures, e.g., 60° C. or more for melted paraffin wax. The tissue samples are placed in tissue cassettes that allow for fluid exchange and that keep individual tissue samples separate throughout the process. Identification of each sample is critical and as such, each sample is individually labeled, preferably by bar code.

After impregnation excess wax (usually found about the edges of the cassette) is trimmed from the cassette either manually with a knife or by a heated plate. If the excess wax is trimmed, e.g., scrapped, from the cassette with a knife or similar instrument and the label contains one or more ripples, then the label can be inadvertently torn. The tissue is then removed from the cassette and placed in a mold. Hot wax is injected into the mold to surround the impregnated tissue. The tissue cassette is then placed on top of and in contact with the hot wax in the mold, and the impregnated sample attaches and fixes itself to the cassette by the hardening of the wax.

Histology laboratories vary greatly in size. Large laboratories will process between 400 and 1,000 cassettes per day. Small laboratories may only process one to 100 per day. The vast majority of small and medium size laboratories today mark their tissue cassettes by handwriting with a pencil or pen on a textured surface molded into the cassette for this purpose. Unfortunately, legibility is a major issue with hand marked cassettes. Additionally, the marking may be partially removed by the chemical washes during tissue processing.

Thermal transfer printed labels provide the desired legibility and, if properly formulated, the print, i.e., ink, can resist the harsh solvents used in tissue processing. For example, the print quality and solvent resistance of a thermal transfer printed label comprising a topcoat made from a composition as described in U.S. Pat. No. 7,081,284 carrying ink from a black 6400 series thermal transfer printer ribbon (available from Brady Worldwide, Inc.) is excellent. However, a mechanical means of attaching the label to the tissue cassette proved necessary due to a lack of a pressure sensitive adhesive (PSA) that can withstand the harsh solvents used in tissue processing. This mechanical attachment involves a form of "riveting" the label to the cassette by plunging a heated probe through the label (typically a multilayer structure of various plastic films) into the tissue cassette (typically made of a plastic, e.g., a polyacetal), melting the plastic of the cassette, and allowing the melted plastic to flow over at least a part of the label in a rivet-like formation (as more fully described in Published Patent Application No. 2008/0053605) to secure it to the cassette. Any number of rivets can be used to attach the label to the cassette but since most labels are rectangular in shape, typically rivets are placed at two of the four corners, or at all four corners.

One inconvenience of this mechanical attachment method is that hot melted wax can work its way under and solidify beneath the label. This, in turn, can cause the label to ripple which not only adversely affects the aesthetic appearance of the label, but can interfere with the ability to read a barcode if such information is printed on the label. Moreover and as earlier noted, the presence of a ripple during the trimming of excess wax from the cassette and lead to an unwanted tear in the label.

Accordingly, of interest is the design and manufacture of a label for a tissue cassette that will not, or only insignificantly, ripple during the process of attaching, e.g., staking, the label to a tissue cassette, or during the process in which the tissue sample within the cassette is processed.

BRIEF SUMMARY OF THE INVENTION

In one embodiment the invention is a multilayer label comprising a polymeric film having opposing facial surfaces, one facial surface of which is in intimate contact with a xylene-resistant, water-based topcoat and the other facial surface of which is in intimate contact with a water-based, melted wax-resistant pressure sensitive adhesive (PSA). The label is constructed in a manner such that it can receive print from a thermal transfer printer.

In one embodiment the invention is a multilayer label comprising a polymeric cloth facesheet having opposing facial surfaces, one facial surface of which is in intimate contact with a xylene-resistant, water-based topcoat and the other facial surface of which is in intimate contact with a PSA which can be either water- or solvent-based. The label is constructed in a manner such that it can receive print from a thermal transfer printer.

In one specific embodiment, the invention is a multilayer, thermal transfer printer label comprising:

A. A xylene-resistant, water-based topcoat layer having first and second opposing planar surfaces, B. A polymeric film layer having first and second opposing planar surfaces, the first planar surface of the film layer in intimate contact with the second planar surface of the topcoat layer, and C. A water-based, melted wax-resistant adhesive layer having first and second opposing planar surfaces, the first planar surface of the adhesive layer in intimate contact with at least a portion of the second planar surface of the film layer.

In one embodiment, the topcoat layer comprises a crosslinked, ethylene acrylic or methacrylic acid polymer. In one embodiment the polymer is crosslinked with melamine or an aziridine. In one embodiment the polymer contains a pigment, such as calcium carbonate, silica, titanium dioxide or clay. The polymeric film layer typically comprises a polyester or polyetherimide, and the adhesive layer typically comprises a PSA.

In one specific embodiment, the invention is a multilayer, thermal transfer printer label comprising:

A. A xylene-resistant, water-based topcoat layer having first and second opposing planar surfaces, B. A polymeric cloth facesheet layer having first and second opposing planar surfaces, the first planar surface of the film layer in intimate contact with the second planar surface of the topcoat layer, and C. A xylene-resistant adhesive layer having first and second opposing planar surfaces, the first planar surface of the adhesive layer in intimate contact with at least a portion of the second planar surface of the film layer.

In one embodiment, the topcoat layer comprises a crosslinked, ethylene acrylic or methacrylic acid polymer. In one embodiment the polymer is crosslinked with melamine or an aziridine. In one embodiment the polymer contains a pigment, such as calcium carbonate, silica, titanium dioxide or clay. In one embodiment, the polymeric cloth layer typically comprises a woven polyester or woven nylon, and the adhesive layer typically comprises a PSA. The labels of this cloth facesheet embodiment are particularly resistant to the formation of ripples when the label-bearing cassette is exposed to the conditions of tissue processing.

In one embodiment the invention is a multilayer label comprising a polymeric film having opposing facial surfaces, one facial surface of which is in intimate contact with a xylene-resistant, water-based topcoat and the other facial surface of which is in intimate contact with a water-based, melted wax-resistant PSA, the label affixed to a substrate. In one embodiment the substrate is a tissue cassette. In one embodiment the label is affixed to the cassette by heat staking.

In one embodiment the invention is a multilayer label comprising a polymeric cloth facesheet, e.g., woven polyester, having opposing facial surfaces, one facial surface of which is in intimate contact with a xylene-resistant, water-based topcoat and the other facial surface of which is in intimate contact with a PSA, the label affixed to a substrate. In one embodiment the substrate is a tissue cassette. In one embodiment the label is affixed to the cassette by heat staking.

Both label constructions of this invention are suitable for use with a heat staking device as described in Published Patent Application No. 2008/2008/0053605. Both label constructions exhibit little, if any, ripples after heat staking to a tissue cassette.

BRIEF DESCRIPTION OF THE DRAWINGS

FIG. 3A is a side view photograph of a rippled multilayer label.

DETAILED DESCRIPTION OF THE PREFERRED EMBODIMENT

Figure 1:
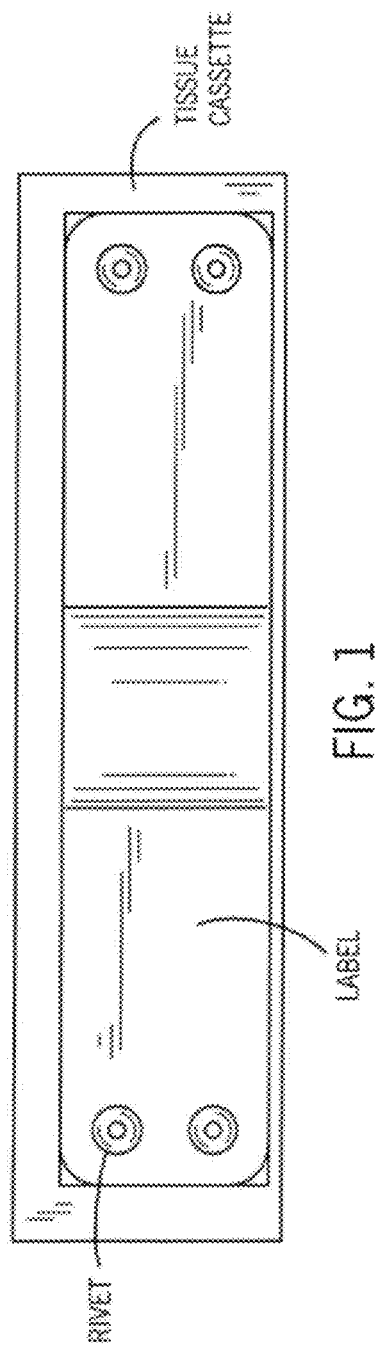
FIG. 1 is a schematic top plan view of a label heat staked to a tissue cassette.

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The terms "comprising", "including", "having" and their derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, layer or label thickness, is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical values and ranges are provided within this disclosure for, among other things, layer and label thickness, temperature, and the like.

"Layer" means a single thickness, coating or stratum spread out or covering a surface.

"Multilayer" means at least two layers.

"Facial surface", "planar surface" and like terms mean the flat surfaces of the layers that are in contact with the opposite and adjacent surfaces of the adjoining layers. Facial surfaces are in distinction to edge surfaces. A rectangular layer or label comprises two facial surfaces and four edge surfaces. A circular layer or label comprises two facial surfaces and one continuous edge surface.

"In intimate contact" and like terms mean that one facial surface of one layer and one facial surface of another layer, or the adhesive layer of a label and the exterior surface of an object or substrate to which the adhesive layer of the label is applied, are in an adhering relationship to one another such as a coating is in an adhering relationship with the substrate to which it is applied.

"Ripple", "rippling" and like terms mean that a part of the label is lifted above the plane of the surface to which it is attached. A label displays significant rippling if a part of the label is lifted at least 3 mil (0.003 inches) above the plane of the surface to which it is attached.

"Xylene resistant" and like terms mean that the topcoat layer of the label does not show any visible effect to the unaided eye after the label is soaked in xylene at 45° C. for two hours.

"Melted wax resistant" and like terms mean that wax does not penetrate into the adhesive layer of the label after the label is soaked in paraffin wax at 60° C. for three hours.

"Water-based" in reference to the topcoat and PSA means the resin systems are either water dispersions or water-borne emulsions, i.e., the water is the continuous phase of the emulsion.

"Solvent-based" in reference to the PSA means the adhesive is carried in an organic solvent, or is soluble in an organic solvent.

"Thermal transfer printer label" and like terms mean a label that can receive and hold print, e.g., ink, in a thermal transfer printer. The thermal transfer printers can be of any size, shape and design, e.g., desk-top, hand held, etc., as can the labels, e.g., individual, carried on a continuous roll or tape, rectangular, circular, etc., with the understanding that the label is sized to the printer of its intended use. The labels may or may not be useful in printers other than thermal transfer printers. Thermal transfer printers are well known in the art, and exemplary printers include BRADYPRINTER™ THT300X, BRADYPRINTER™ THT300X PLUS, BRADYPRINTER™ THT300X PLUS II, BRADYPRINTER™ THT600X, BRADYPRINTER™ THT600X PLUS, BRADYPRINTER™ THT300X PLUS II, BRADY® BBP81, BRADY® MVP PLUS, TAGUS T33, BRADY® IP300 and similar models made by Zebra and Datamax.

In the embodiment of the invention in which the interior layer is a film layer, the film can be transparent, translucent or opaque, and its chemical composition is not critical to the invention so long as it has sufficient film integrity for its intended use. Typically, it comprises polyester, such as a condensation product of terephthalic acid and a glycol, e.g., ethylene glycol, isophthalic acid and a glycol, or mixtures of terephthalic acid, isophthalic acid and a glycol, or a polyetherimide. One particularly useful family of films of this type is a highly oriented polyester film known in the trade as Melinex®, which can be print treated or non-print treated. Other useful films can be constructed from polyethylene naphthalate (PEN) or polyetherimide (PEI).

Still other useful polymeric films include films of acrylic polymers and interpolymers; cellulosic polymers, including cellulose acetate, cellulose acetate butyrate, cellulose acetate propionate and mixtures of these polymers; polyolefins, including homopolymers and interpolymers of ethylene or propylene; polyethersulfone (PES); polysulfone; and other polymeric films which are flexible and sufficiently strong to be used as label facestocks. The polymeric film typically has a thickness of 1 or more mils, preferably of 2 to 5 mils.

In the embodiment of the invention in which the interior layer is a polymeric cloth facesheet, typically the cloth facesheet is woven polyester, e.g., polyethylene terephthalate (PET), woven nylon or other woven clothes of 3 or more, preferably 3 to 15, mils in thickness. Preferably the cloth is woven polyester with a thickness of 5 to 9 mils.

The topcoat of both the polymeric film and polymeric cloth facesheet is a water-based, crosslinked, thermal transfer printable xylene-resistant polymer or polymer blend, such as L2546-70 (a crosslinked, ethylene acrylic or methacrylic acid polymer available from Brady Worldwide, Inc.). Other suitable topcoats are described in U.S. Pat. No. 7,081,284. The thickness of the topcoat typically ranges from 0.3 to 2.5 mils, preferably from 0.3 to 1 mil. The topcoat can be applied to either the polymeric film or cloth facesheet in any manner, e.g., slot die, rod, roll coating (reverse roll, gravure roll, roll blade, etc.), dip bath, spraying and the like.

The PSA used as the third or bottom layer of the label is a melted wax resistant, water-based material of 0.5 to 3 mils in thickness, preferably of 1 to 2 mils in thickness, if applied to the bottom or second facial surface of a polymeric film. Representative examples of such PSAs include PROHESION® 3100 and PROHESION® 3200 (water-based, high salt acrylic acid PSA systems available from Rohm and Haas) and GME-2484 (an acrylic emulsion PSA available from Cytec).

The melted wax resistance of the PSA is of less importance if the PSA is applied to the bottom or second facial surface of a polymeric cloth facesheet because the cloth facesheet is less prone to rippling. The polymeric cloth facesheet more readily conforms to the surface of the tissue cassette than does a film facesheet, and is thus less prone to ripple under the conditions of tissue processing. In this circumstance, the PSA can simply be a water- or solvent-based material with a thickness of 0.5 to 4 mils, preferably 2 to 3 mils. Representative examples of such PSA include copolymers of alkyl acrylates that have a straight chain of from 4 to 12 carbon atoms and a minor proportion of a highly polar copolymerizable monomer such as acrylic acid. These adhesives are more fully described in USP Re. 24,906 and U.S. Pat. No. 2,973,286. Alternative pressure sensitive adhesives include ultraviolet curable pressure sensitive adhesives such as Durotak 4000 that is available from National Starch and Chemical. Like the topcoat, the PSA can be applied to either the polymeric film or cloth facesheet in any manner, e.g., slot die, rod, roll coating (reverse roll, gravure roll, roll blade, etc.), dip bath, spraying, etc.

Optionally, and preferably, the labels of either construction include a release liner that is adjacent to and in intimate contact with the PSA layer to protect the adhesive before the label is applied to a substrate, e.g., a tissue cassette. Typical and commercially available release liners comprise a silicone-treated release paper, and are available from Loparex (products such as 1011, 22533 and 11404), CP Films and Akrosil.

The label is constructed in any convenient manner, typically by applying a coating to one facial surface of the film or cloth, and a PSA to the opposing facial surface of the film or cloth. The topcoat and PSA can be applied sequentially (in either order) or simultaneously. The label can comprise additional layers, but these layers are usually interior layers with the purpose of imparting a particular property to the label, e.g., a primer layer to improve the adhesion of the topcoat to the facestock, etc. Although the primary purpose of the labels of this invention are for attachment to tissue cassettes, these labels can also be used in other applications, e.g., manufacturing process tracking, security, etc.

The labels of this invention are applied to the tissue cassette in the same manner as known labels, e.g., as described in Published Patent Application No. 2008/0053605. FIG. 1 illustrates one such label after attachment to a tissue cassette. In this figure, the label is attached with four rivet-like structures, one in each corner. Alternative attachment geometries include one, two, three, and more than four rivet-like structures. Although the rivets are usually located in a corner so as to maximize the surface available for carrying information, as a practical matter the location of the rivet(s) can be anywhere on the label surface.

Figure 2:
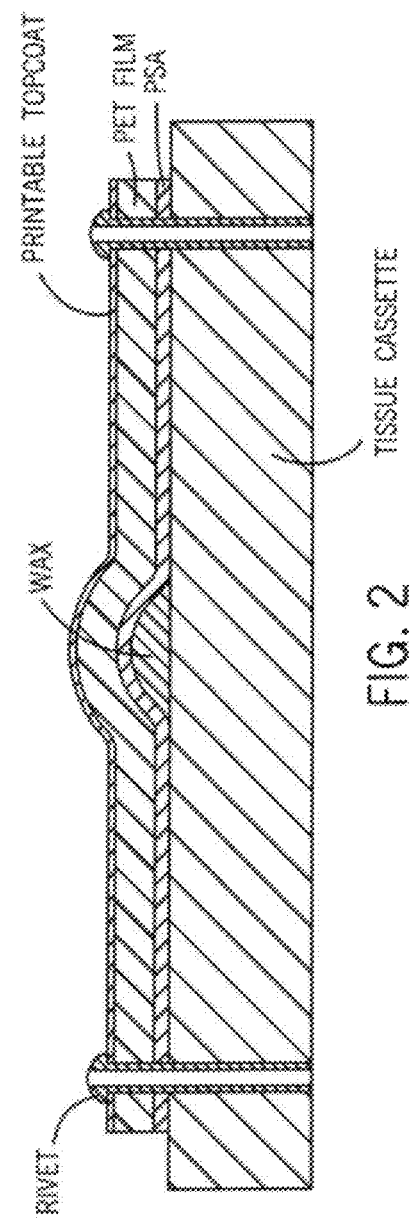
FIG. 2 is a schematic side view of a rippled, multilayer label heat staked to a tissue cassette.
Figure 3B:
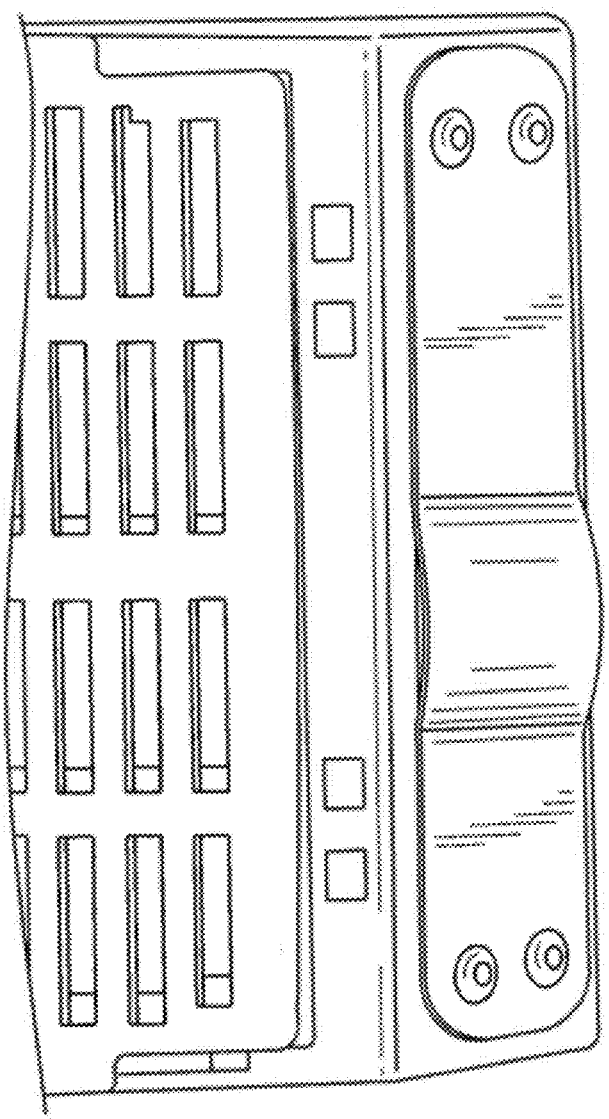
FIG. 3B is a top view photograph of the rippled multilayer label of FIG. 3A.

FIG. 2 illustrates an attached label with a ripple. In this figure a single ripple is positioned in the center of the label, but known labels can have more than one ripple, and the ripples can occur anywhere along the length of the label. FIGS. 3A and 3B show an actual rippled label from two different perspectives, e.g., top and side.

The following examples are illustrative of certain specific embodiments of this invention. Unless otherwise noted, all parts and percentages are by weight.

Specific Embodiments

Early attempts to control label ripple included cutting different shapes and sizes of slits into the label, but this proved ineffective. The use of a heat shield on the riveting equipment and/or the use of a shorter cycle time in the rivet formation diminished but did not eliminate the ripple problem. Even after these modifications, tissue processing conditions resulted in an average of 65% of the labels with a common solvent-based PSA tested being rippled. The tissue processing conditions are detailed in Tables 1 and 2 below.

TABLE 1

Typical Standard Tissue Processing Programs

| | | Standard Processing 1 | | Standard Processing 2 | |
|---|---|---|---|---|---|
| Station | Chemical | Time (Minutes) | Temperature (° C.) | Time (Minutes) | Temperature (° C.) |
| 1 | DI water | 60 | 20 (RT) | 17 | 35 |
| 2 | DI water | 60 | 20 (RT) | 17 | 35 |
| 3 | 70% Ethanol | 60 | 20 (RT) | 17 | 35 |
| 4 | 80% Ethanol | 60 | 20 (RT) | 17 | 35 |
| 5 | 95% Ethanol | 60 | 20 (RT) | 17 | 35 |
| 6 | 95% Ethanol | 60 | 20 (RT) | 17 | 35 |
| 7 | 100% Ethanol | 60 | 20 (RT) | 17 | 35 |
| 8 | 100% Ethanol | 60 | 20 (RT) | 17 | 35 |
| 9 | Xylene | 60 | 20 (RT) | 17 | 35 |
| 10 | Xylene | 60 | 20 (RT) | 17 | 35 |
| 11 | T555 Wax | 60 | 60 | 17 | 60 |
| 12 | T555 Wax | 60 | 60 | 17 | 60 |
| 13 | T555 Wax | 60 | 60 | 17 | 60 |

RT = Room Temperature

TABLE 2

Higher Temperature Processing Program

| | | Standard Processing 3 | |
|---|---|---|---|
| Station | Chemical | Time (Minutes) | Temperature (C.) |
| 1 | DI water | 17 | 45 |
| 2 | DI water | 17 | 45 |
| 3 | 70% Ethanol | 17 | 45 |
| 4 | 80% Ethanol | 17 | 45 |
| 5 | 95% Ethanol | 17 | 45 |
| 6 | 95% Ethanol | 17 | 45 |
| 7 | 100% Ethanol | 17 | 45 |
| 8 | 100% Ethanol | 17 | 45 |
| 9 | Xylene | 17 | 45 |
| 10 | Xylene | 17 | 45 |
| 11 | T555 Wax | 17 | 60 |
| 12 | T555 Wax | 17 | 60 |
| 13 | T555 Wax | 17 | 60 |

These investigations did show, however, that various stresses placed on the label during the staking process contributed to the rippling, e.g., the force of the clamp that is used to secure the tissue cassette to the riveting equipment, the heat from the hot probe used to puncture the label and melt the plastic, and the exposure to the pumping and vacuum forces resulting from the tissue fixation/embedding process. The texture of the cassette surface to which the label is attached also can contribute to the rippling of the label.

Figure 4:
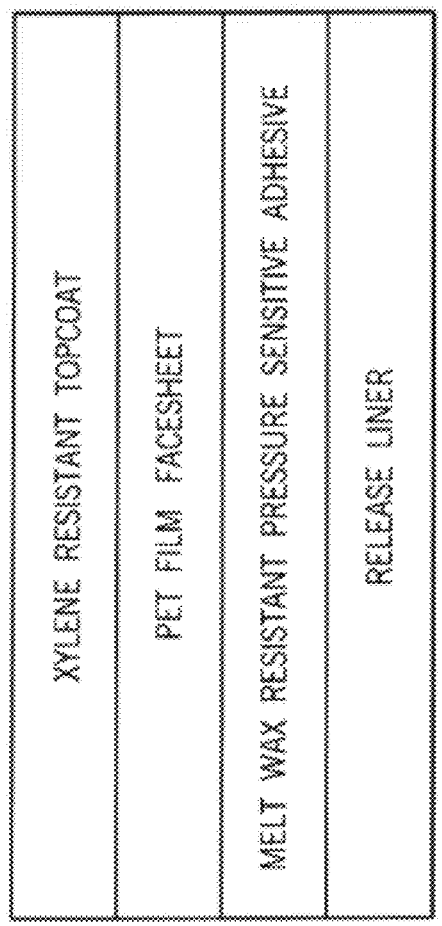
FIG. 4 is a side view schematic of one embodiment of a multilayer label of this invention.

FIG. 4 is a side view schematic of a multilayer label comprising a melted wax resistant, water-based PSA layer coated onto a white polyester film (PET) with a L2546-70 topcoat. Table 3 reports the ripple test results of two such labels. The labels were tested under the protocol of standard processing 2. The labels comprised Prohesion® 3100 PSA coated on the opposite side of a 2 mil thick white PET (DuPont Melinex® 329) film with a topcoat of L2546-70. The labels were dried at 260° F. for 3 minutes and 5 minutes, respectively, at 1 mil and 2 mil thick PSA. The labels were then die cut into cassette label size and laminated on the two worst cassettes for rippling, i.e., Histosette® I M480-6 (a blue tissue and biopsy processing/embedding cassette supplied by Simport) and Histosette® I M498-6 (a tissue cassette with an anterior writing area at a 45° rather than a 30°, angle, also supplied by Simport) based on the ripple test results of common solvent-based PSA. The labels were without ripples.

TABLE 3

Ripple Test Results of Prohesion 3100 on 2 mil PET with L2546-70

| Sample ID | Percentage of Rippled on M480 Cassette | Percentage of Rippled on M498-6 Cassette |
|---|---|---|
| 2 mil PET/3100/1 mil/3 min | 0 | 0 |
| 2 mil PET/3100/1 mil/5 min | 0 | 0 |
| 2 mil PET/3100/2 mil/3 min | 0 | 0 |
| 2 mil PET/3100/2 mil/5 min | 0 | 0 |

Table 4 reports the ripple test results of two similar such labels. The labels were tested under the protocol of standard processing 2. The labels comprised Prohesion® 3100 PSA coated on the opposite side of a 3 mil thick white PET (DuPont Melinex® 329) film with a topcoat of L2546-70. The labels were dried at 260° F. for 3 minutes and 5 minutes, respectively, at 1 mil and 2 mil thick PSA. The labels were then die cut into cassette label size and laminated on M480-6 and M498-6 cassettes. The labels were without ripples.

TABLE 4

Ripple Test Results of Prohesion ® 3100 on
3 mil PET with L2546-70 Topcoat

| Tissue Cassette | 3 Mil PET/3100/ 1 mil thick/3 min./ 260° F. | 3 Mil PET/3100/ 2 mil thick/3 min./ 260° F. |
|---|---|---|
| M480-6 | 0 | 0 |
| M498-6 | 0 | 0 |
| M480-3 | 0 | 0 |
| M490-6 | 0 | 0 |
| M492-2 | 0 | 0 |
| M493-3 | 0 | 0 |
| M507-2 | 0 | 0 |
| M510-6 | 0 | 0 |
| M515-6 | 0 | 0 |
| MC600-2 | 0 | 0 |
| MC650-1 | 0 | 0 |
| 4118-01 | 0 | 0 |
| 4187 | 0 | 0 |
| 4184 | 0 | 0 |
| M505-2 | 0 | 0 |

Table 5 reports the ripple results of labels made on 2 mil white PET and 3 mil white PET tested under the protocol of high temperature process processing 3 (the program detail is reported in Table 2). The 3 mil white PET labels showed no ripples although the 2 mil white PET labels showed some modest ripples on the two worst cassettes M480-6 and M498-6. The thicker the PET film, the fewer the ripples reported.

TABLE 5

Ripple Test Resulta of Prohesion ® 3100 on 3 mil PET with
L2546-70 Topcoat Through High Temperature Process (Processing #3)

| Sample IP | Percentage of Rippled |
|---|---|
| 2 mil PET/3100/1 mil/3 min 260 F. | 2 |
| 2 mil PET/3100/2 mil/3 min 260 F. | 3 |
| 3 mil PET/3100/1 mil/3 min 260 F. | 0 |
| 3 mil PET/3100/1 mil/3 min 260 F. | 0 |
| 3 mil PET/3100/1 mil/3 min 300 F. | 0 |
| 2 mil PET/3100/2 mil/3 min 300 F. | 0 |

Table 6 reports the results from the standard tissue processing program in which the polymeric film of the label of FIG. 4 is replaced with a polymeric cloth facesheet. Topcoat L2546-70 was coated onto one facial surface of a white 7-mil thick woven PET cloth N038 supplied by Dynic USA Corporation, and 1 or 2 mils of a solvent-based PSA (Duro-Tak® 80-115A available from National Starch & Chemical) was applied to the other facial surface.

TABLE 6

Rippling Test Results of Woven PET with the Control Adhesive
at Different Drying Time

| Sample IP | Percentage of Rippled |
|---|---|
| N038 woven PET/1 mil/1 min | 0 |
| N038 woven PET/1 mil/3 min | 0 |

TABLE 6-continued

Rippling Test Results of Woven PET with the Control Adhesive
at Different Drying Time

| Sample IP | Percentage of Rippled |
|---|---|
| N038 woven PET/1 mil/5 min | 0 |
| N038 woven PET/2 mil/1 min | 0 |
| N038 woven PET/2 mil/3 min | 0 |
| N038 woven PET/2 mil/5 min | 0 |
| N038 woven PET/3 mil/1 min | 0 |
| N038 woven PET/3 mil/3 min | 0 |
| N038 woven PET/3 mil/5 min | 0 |

Although the invention has been described in considerable detail through the preceding description, drawings and example, this detail is for the purpose of illustration. One skilled in the art can make many variations and modifications without departing from the spirit and scope of the invention as described in the appended claims.

What is claimed is:

1. A labeled tissue cassette comprising a tissue cassette and a ripple resistant, multilayer thermal transfer printer label affixed to the tissue cassette, the label comprising:
   A. A xylene-resistant topcoat layer having first and second opposing planar surfaces, the topcoat layer comprising a crosslinked ethylene acrylic or methacrylic acid polymer;
   B. An interior layer comprising a polymeric film or polymeric cloth facesheet, the interior layer having first and second planar surfaces of which the first planar surface of the interior layer is in intimate contact with the second planar surface of the topcoat layer;
   C. A water-based, melted-wax resistant, acrylic-based adhesive layer having first and second opposing planar surfaces, the first planar surface of the adhesive layer in intimate contact with the second planar surface of the interior layer; and
   wherein the polymeric film of the interior layer of the label has a thickness of 3-5 mils, or wherein the polymeric cloth facesheet of the interior layer of the label has a thickness of 5-9 mils.

2. The labeled tissue cassette of claim 1 in which the polymeric film of the interior layer of the label is one of a polyester and polyetherimide.

3. The labeled tissue cassette of claim 1 in which the polymeric cloth facesheet of the interior layer is one of woven polyester or woven nylon.

4. The labeled tissue cassette of claim 1 in which the tissue cassette comprises polyacetal.

5. The labeled tissue cassette of claim 1 in which the label is affixed to the cassette by heat staking.

6. The labeled tissue cassette of claim 1 in which a print is provided on the topcoat layer of the label.

7. The labeled tissue cassette of claim 1 in which the topcoat layer of the label has a thickness of 0.3-2.5 mils and the adhesive layer of the label has a thickness of 0.5-4 mils.

8. The labeled tissue cassette of claim 1 in which the adhesive layer comprises a pressure sensitive adhesive.

* * * * *